US009987184B2

(12) United States Patent
Borovinov

(10) Patent No.: US 9,987,184 B2
(45) Date of Patent: Jun. 5, 2018

(54) SYSTEMS, METHODS, AND MEDIA FOR PROVIDING VIDEO OF A BURIAL MEMORIAL

(71) Applicant: Valentin Borovinov, Little Neck, NY (US)

(72) Inventor: Valentin Borovinov, Little Neck, NY (US)

(*) Notice: Subject to any disclaimer, the term of this patent is extended or adjusted under 35 U.S.C. 154(b) by 362 days.

(21) Appl. No.: 14/172,978

(22) Filed: Feb. 5, 2014

(65) Prior Publication Data

US 2014/0218519 A1 Aug. 7, 2014

Related U.S. Application Data

(60) Provisional application No. 61/761,137, filed on Feb. 5, 2013.

(51) Int. Cl.
| | |
|---|---|
| H04N 5/63 | (2006.01) |
| A61G 99/00 | (2006.01) |
| H04N 5/225 | (2006.01) |
| A61G 17/00 | (2006.01) |
| A61G 17/08 | (2006.01) |

(52) U.S. Cl.
CPC ............ *A61G 99/00* (2013.01); *H04N 5/225* (2013.01); *A61G 17/00* (2013.01); *A61G 17/08* (2013.01)

(58) Field of Classification Search
CPC ........ A61G 99/00; A61G 17/08; A61G 17/00; H04N 5/225
See application file for complete search history.

(56) References Cited

U.S. PATENT DOCUMENTS

| | | | | |
|---|---|---|---|---|
| 4,244,500 A | * | 1/1981 | Fournier | A45F 5/00 224/201 |
| 4,893,140 A | * | 1/1990 | Yamamoto | G03B 15/05 396/177 |
| 5,729,921 A | * | 3/1998 | Rojas | E04H 13/006 27/1 |
| 6,324,736 B1 | * | 12/2001 | Atrio | A61G 17/04 27/14 |
| 6,414,663 B1 | | 7/2002 | Manross | |
| 6,637,911 B2 | | 10/2003 | Sittner | |
| 6,956,599 B2 | | 10/2005 | Lim et al. | |

(Continued)

OTHER PUBLICATIONS

Peri et al., "Generation of Perspective and Panoramic Video from Omnidirectional Video", Proceeding of DARPA Image Understanding Workshop, New Orlean, May 1997.*

*Primary Examiner* — Sath V Perungavoor
*Assistant Examiner* — Philip Dang
(74) *Attorney, Agent, or Firm* — Byrne Poh LLP

(57) ABSTRACT

Systems, methods, and media for providing video of a burial memorial are provided. In accordance with some implementations of the disclosed subject matter, systems for providing video of a burial memorial are provided, the systems comprising: a burial memorial; a camera mounted to the burial memorial and directed toward the burial memorial, wherein the camera is configured to capture images of the burial memorial and generate the video including the images; a transceiver that is coupled to the camera, that receives the video, that transmits the video to a user device, and that receives audio from the user device; and an audio output device that receives the audio from the user device and that plays the audio at the burial memorial.

10 Claims, 13 Drawing Sheets

(56) References Cited

U.S. PATENT DOCUMENTS

| | | |
|---|---|---|
| 6,980,107 B1 | 12/2005 | Ziegler |
| 6,989,736 B2 * | 1/2006 | Berberich ................. B60R 1/00 340/425.5 |
| 7,089,495 B2 * | 8/2006 | Barrows ............... E04H 13/003 360/12 |
| 7,460,655 B2 | 12/2008 | Fujisawa et al. |
| 7,554,570 B2 | 6/2009 | Benco et al. |
| 7,609,506 B2 | 10/2009 | Aguierre |
| 7,688,203 B2 | 3/2010 | Rockefeller et al. |
| 7,965,859 B2 * | 6/2011 | Marks .................. H04N 5/2226 345/84 |
| 8,068,035 B1 | 11/2011 | Salcedo et al. |
| 8,204,272 B2 * | 6/2012 | Marks .................. H04N 5/2226 345/84 |
| 8,228,364 B2 * | 7/2012 | Cilia ....................... B60R 11/04 348/39 |
| 8,599,266 B2 * | 12/2013 | Trivedi .............. G06K 9/00234 348/143 |
| 2003/0081952 A1 * | 5/2003 | Geng .................... G03B 17/00 396/427 |
| 2003/0208890 A1 * | 11/2003 | Kim ....................... A62B 33/00 27/31 |
| 2005/0204300 A1 | 9/2005 | Mindrum |
| 2007/0182811 A1 | 8/2007 | Rockefeller et al. |
| 2008/0106598 A1 | 5/2008 | Silva |
| 2008/0198030 A1 | 8/2008 | Pringle |
| 2010/0307037 A1 | 12/2010 | Chi |
| 2011/0045852 A1 | 2/2011 | Kovach |
| 2011/0047893 A1 | 3/2011 | Iezza |
| 2012/0044354 A1 | 2/2012 | Cheng et al. |
| 2012/0062691 A1 | 3/2012 | Fowler et al. |
| 2012/0075465 A1 | 3/2012 | Wengrovitz et al. |
| 2012/0268565 A1 * | 10/2012 | Guilleminot ........... H04N 5/247 348/46 |

* cited by examiner

SYSTEMS, METHODS, AND MEDIA FOR PROVIDING VIDEO OF A BURIAL MEMORIAL

CROSS-REFERENCE TO RELATED APPLICATION

This application claims the benefit of U.S. Provisional Patent Application No. 61/761,137, filed Feb. 5, 2013, which is hereby incorporated by reference herein in its entirety.

TECHNICAL FIELD

This invention generally relates to memorials such as forestaries and cemeteries and more particularly to providing a viewing service to the friends, relatives and acquaintances of the individuals interred within such locations.

BACKGROUND

Throughout history and across cultural divisions, a variety of different ceremonies and memorials have been used to commemorate the death of a loved one. Indeed, ceremonies and memorials have become integral for helping the living cope with the death and for commemorating the loved one for future generations. For instance, traditional western ceremonies typically involve a funeral home visitation, a burial, and a wake, with the grave site being marked by a headstone. In case of cremation, ashes are often placed in a sealed urn. For many historically significant individuals, their deaths are sometimes commemorated with a memorial, such as a statue or mausoleum, which is often dedicated years after individual's death.

While traditional ceremonies and memorials are without a doubt important, there are shortcomings. For instance, visitors have traditionally been required to be physically present at the ceremony or at the memorial to view or reflect on the individual. If not physically present at the ceremony or the memorial, one cannot share in the achievements and memories associated with the individual. Some relatives and friends may live in distant cities or other countries. Some may not be able to physically attend because of business or health reasons. Furthermore, some people have the need to be with their loved one more often than others.

Accordingly, to address these shortcomings, a solution using current advancements in wireless video communication is desirable.

SUMMARY

Systems, methods, and media for providing video of a burial memorial are provided. In accordance with some implementations of the disclosed subject matter, systems for providing video of a burial memorial are provided, the systems comprising: a burial memorial; a camera mounted to the burial memorial and directed toward the burial memorial, wherein the camera is configured to capture images of the burial memorial and generate the video including the images; a transceiver that is coupled to the camera, that receives the video, that transmits the video to a user device, and that receives audio from the user device; and an audio output device that receives the audio from the user device and that plays the audio at the burial memorial.

In accordance with some implementations of the disclosed subject matter, methods for providing video of a burial memorial are provided, the methods comprising: capturing images of the burial memorial and generating the video including the images; receiving the video, transmitting the video to a user device, and receiving audio from the user device; and receiving the audio and playing the audio at the burial memorial.

In accordance with some implementations of the disclosed subject matter, non-transitory computer-readable media containing computer executable instructions that, when executed by a processor, cause the processor to perform a method for presenting video of a burial memorial are provided, the method comprising: capturing images of the burial memorial and generating the video including the images; receiving the video, transmitting the video to a user device, and receiving audio from the user device; and receiving the audio and playing the audio at the burial memorial.

DETAILED DESCRIPTION

Figure 1:
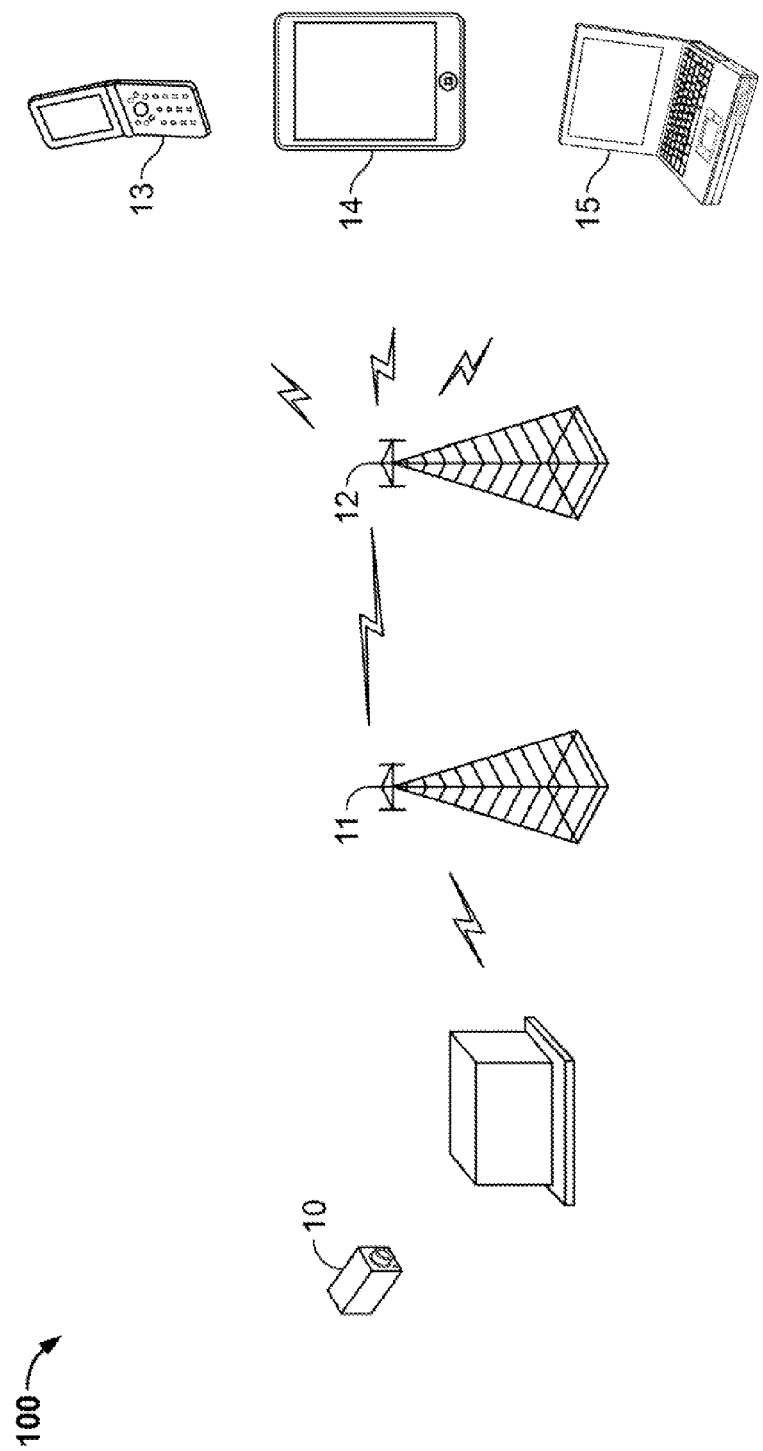
FIG. 1 shows a schematic diagram of an example of a system for remote access to a grave marker in accordance with some embodiments of the disclosed subject matter.

According to some embodiments, systems, methods, and media for providing video of a burial memorial are provided.

In some embodiments, a mobile data (e.g., Wi-Fi, 3G, or 4G cellular network) enabled digital video camera (e.g., a digital camera with built-in or separate logic controller and wireless modem, or Hot Spot device) may be integrated with a burial memorial (e.g., a grave marker) in such a way that it faces the burial memorial. As a result of expanding mobile data coverage in today's world, this camera can be reached from a remote device (e.g., a smart phone or a computer) by a relative or friend of the deceased from a wide variety of locations. When a commutation session is established between the camera and the remote device the camera may turn itself on displaying on the screen at the remote location the façade of the burial memorial. In some embodiments, a microphone that is built into the camera or the memorial can transmit to the remote device sounds that are heard at the grave site, such as the sounds of birds chirping or the wind blowing. Furthermore, in some embodiments, a speaker that is built into the camera or the memorial could output at the gravesite words uttered at the remote device by the living relative or friend of the diseased. Moreover, in some embodiments, motion sensor-activated alarm circuit can automatically notify designated relatives or security authorities in an event of grave invasion from vandals or large animals. Additionally or alternatively, in some embodiments, the camera and other accompanying equipment may be powered by a rechargeable battery that is integrated into the memorial. The battery may be charged using a solar panel that is integrated into the memorial. The burial memorial may be a tombstone, an urn base, a mausoleum, or any other suitable memorial.

In some embodiments, camera and accompanying devices can be turned on by a local timer only at predetermined time intervals during the day or during the week for battery energy saving considerations.

In some embodiments, a burial memorial is provided. The burial memorial includes a speaker and a hardware processor coupled to the speaker. The hardware processor is configured to receive, over a communications network, an indication of a sound and render the sound using the speaker. In some embodiments, the indication of sound may be data that encodes the sound. In some embodiments, the indication of the sound may be an identifier for a sound recording that is stored in a memory that is part of the burial memorial. In some embodiments, the memorial may include a transceiver coupled to the hardware processor. The burial memorial may be a tombstone, an urn base, a mausoleum, or any other suitable memorial.

In some embodiments, a burial memorial is provided. The burial memorial includes a plurality of lighting bodies that are integrated into the memorial, a camera, and a hardware processor coupled to the camera and the lighting bodies. The hardware processor is configured to receive, over a communications network, a request for an image or video and activate the lighting bodies in response to the request. In some embodiments, the hardware processor may further be configured to capture, by using the camera, video or an image in response to the request. In some embodiments, the hardware processor may be configured to transmit the captured video or image over a communications network. In some embodiments, the memorial may include a transceiver coupled to the hardware processor. In some embodiments, the memorial may include an ornament and the one or more lighting bodies may be integrated into the ornament. In some embodiments, the camera may be facing towards a wall of the memorial. In some embodiments, the camera may be mounted on a bracket that is mounted on the wall and extends away from the wall. The burial memorial may be a gravestone, an urn base, a mausoleum, or any other suitable memorial.

FIG. 1 shows an example diagram of a system 100 in accordance with some embodiments of the disclosure. Memorial 10 may be a tombstone, an urn base, a mausoleum, or another suitable memorial. Memorial 10 may include one or more integrated electronic components which permit users to remotely observe sounds and sights at the location where memorial 10 is placed. In some embodiments, memorial 10 may include one or more of a wireless Hot spot device, digital Internet Protocol (IP) or cellular network camera, speaker, microphone, transmitter, transceiver, display screens, remotely controllable relay(s), or any other suitable component. Towers 11 and 12 may be mobile data (e.g., Wifi, 3G, 4G wireless data, etc.) towers providing long distance communication between the grave site and the end user. Towers 11 and 12 may be part of a communications network that connects memorial 10 with devices 13, 14, and 15. Devices 13, 14 and 15 may be different end-user devices that are capable of transmitting and receiving video and audio data over a communications network. In particular, device 13 may be a mobile data (e.g., Wi-Fi, 3G, 4G wireless data, etc.) enabled smartphone using commercial wireless provider network. Device 14 may be a tablet capable of connecting to a commercial wireless provider network. Device 15 may be a mobile data (e.g., Wi-Fi, 3G, 4G wireless data, etc.) enabled (by built-in or external modem) computer using commercial wireless provider network. Although in this example, devices 13-15 are connected to memorial 10 via a Wi-Fi, 3G, or 4G network, in other examples devices 13-15 may be connected to memorial 10 via any suitable type of network (e.g., LAN, the Internet, a wired network, etc.).

Figure 2:
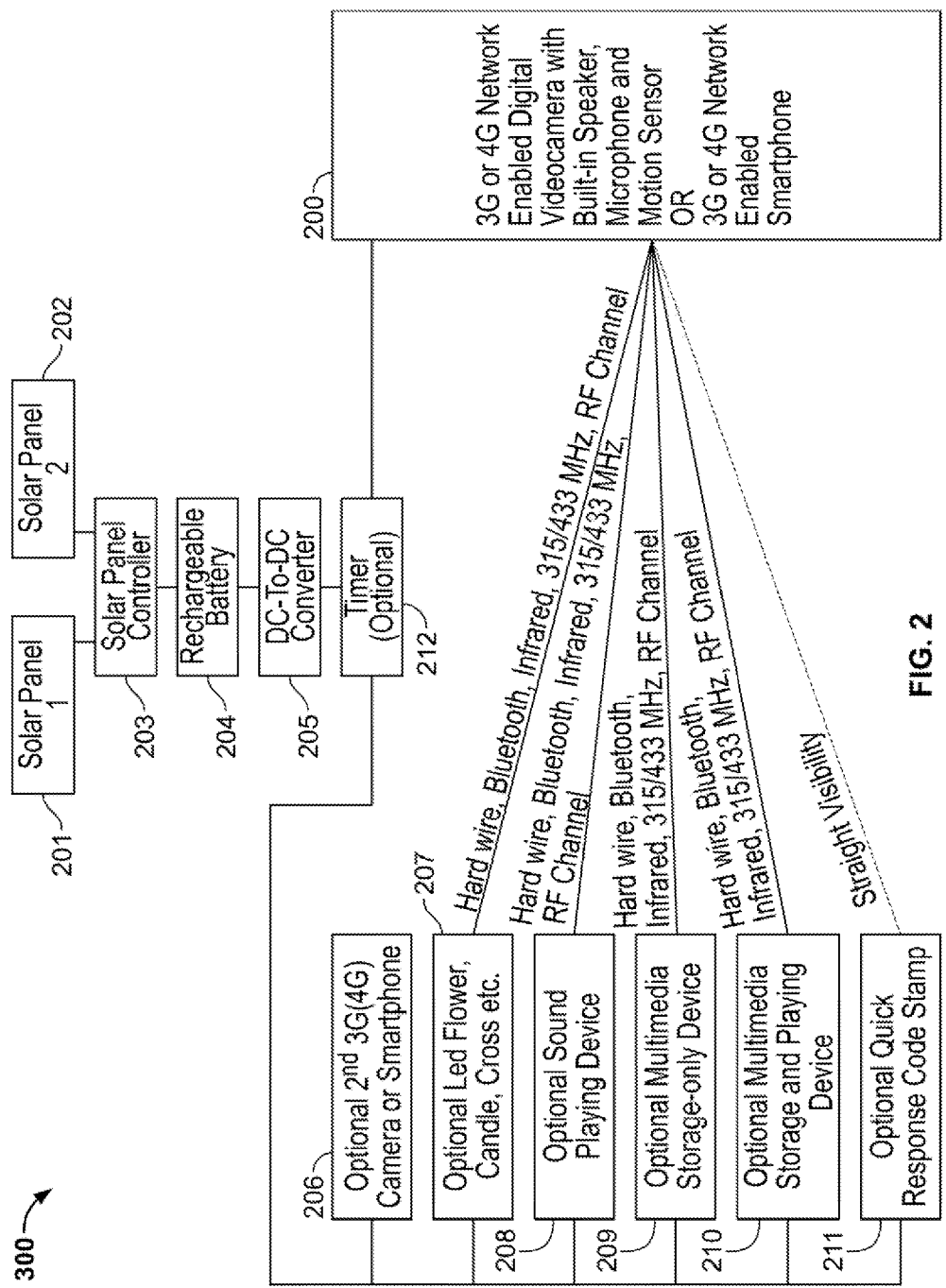
FIG. 2 shows a schematic diagram of an example of a system for presenting video of a burial memorial in accordance with some embodiments of the disclosed subject matter.

FIG. 2 depicts an example diagram of a system 300 in accordance with aspects of the disclosure. Some or all of the components of system 300 may be integrated into memorial 10 (FIG. 1). Additionally or alternatively, some or all of the components of system 300 may be integrated into a mounting bracket, such as mounting bracket 32 or 130 (e.g., see FIGS. 3 and 13A-D). In this example, system 300 includes camera 200, solar panels 201-202, controller 203, battery 204, DC-to-DC converter 205, optional timer 212, camera 206, ornament 207, sound playing device 208, storage device 209, media player 210, and quick response code stamp 211. In some embodiments, however, system 300 may include any subset and/or combination of these components.

Camera 200 may include one or more of a camera, a hardware processor, system on a chip (SoC), memory, transceivers, and other suitable hardware. In some embodiments, camera 200 may include a speaker, one or more microphones, and one or more relays. Camera 200 may be mounted on memorial 10 and in operation it may transmit, over a communications network, images and/or sounds from the site of the memorial 10. In some embodiments, the hardware processor of camera 200 may be configured to control the operation of other components of system 200, such as ornament 207 or sound playing device 208. Additionally or alternatively, in embodiments where camera 200 is not included, another wireless network enabled hardware processor may be used to control the operation of other components of system 300.

Figure 8:
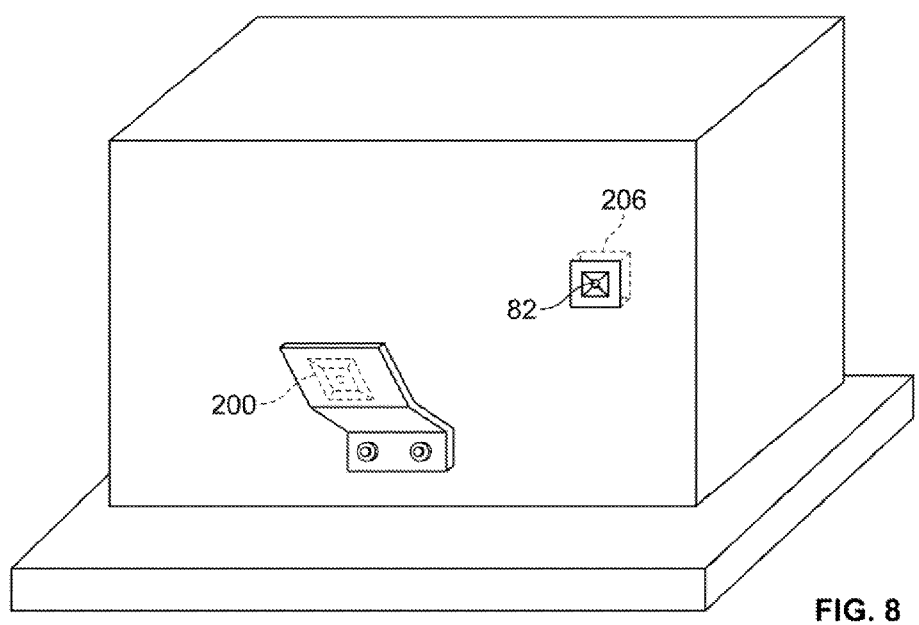
FIG. 8 shows an example of a second mobile data enabled digital camera mounted on a memorial in accordance with some embodiments of the disclosed subject matter.

Panels 201 and 202 may be weather sealed solar panels that are configured to charge battery 204. Controller 203 may be a solar panel controller that maintains a uniform battery charging current during periods of uneven external lighting intensity. Battery 204 may be a lithium-ion rechargeable battery with current capacity adjusted accordingly to the total consumption of all optional components comprising any given configuration. Battery 204 may be configured to power any one of the components of system 300. Converter 205 may be a DC-to-DC converter and as such, its function may be to adapt the battery voltage to different voltages needed for the operation of the main and the various optional devices (e.g., 5V for the video camera, 12V for an optional multimedia playing device and so on). Timer 212 may be very low current drawing device and may be used to provide power to other components during certain time intervals in order to reduce loss of battery power during low or no use periods. Camera 206 may be a mobile data (e.g., Wi-Fi, 3G, 4G wireless data, etc.) enabled digital video camera or smartphone that can optionally be placed on the grave marker, as shown in FIG. 8. Unlike camera 200, which faces the grave marker, camera 206 may be positioned to face away from it. In some embodiments, camera 206 may have a different network address from camera 200, thereby permitting users to connect to camera 206 independently of camera 200.

Ornament 207 may be any type of tombstone ornament, such as a flower, candle, or cross. In some embodiments, ornament 207 may be mounted on the grave marker surface as shown on FIG. 6. One or more light emitting diodes (LEDs) 63 and 64 may be installed inside ornament 207. The LEDs may be configured to provide illumination for camera 10 and they may be activated selectively by camera 200. In some embodiments, ornament 207 and camera 200 may be connected to one another via any type of connection, such as a hard wired connection, a Bluetooth-enabled connection, an Infrared connection, a 315/433 MHz RF channel connection, etc. Sound playing device 208 may be a portable music player including music storage media, a media access interface, an amplifier, and/or a speaker. Device 208 may be integrated in memorial 10 or in ornament 207 (FIG. 7). In some embodiments, device 208 may be controlled by devices 13-15 through camera 200. In some embodiments, a microphone that is part of camera 200 may detect the sound produced by device 208 and transmit that sound to one or more of devices 13, 14, and 15 via the network. Device 208 and camera 200 may be connected to one another via any type of connection, such as a hard wire connection, a Bluetooth-enable connection, an infrared connection, a 315/433 MHz RF channel connection, etc.

Storage device 209 may be a storage device, such as a RAM, ROM, flash memory, or any other suitable type of memory. Storage device 209 may be mounted independently on the grave marker as shown on FIG. 9. Storage device 209 may be configured to store audio and/or video content. Storage device 209 may be connected to camera 200 via any type of suitable connection, such as a hard wired connection, a Bluetooth-enabled connection, an Infrared connection, or a 315/433 MHz RF channel connection, etc. Information stored on storage device 209 may be retrieved, decoded, and transmitted by camera 200 to one of devices 13-15. Media player 210 may be a video player, or audio player, that is integrated into memorial 10. In some embodiments, media player 210 may be remotely activated via camera 200 and its stored information can be heard and seen by the distant viewer using an appropriate smartphone application. The memory content of media player 210 can be edited by remote users who have authorization to do so (e.g., have an authorized PIN or password). Media player 210 and camera 200 may be connected to one another via any type of connection, such as a hard wired connection, a Bluetooth-enabled connection, an Infrared connection, or a 315/433 MHz RF channel connection, etc. Stamp 211 may be a Quick Response(QR) Code Stamp mounted on the grave marker. In some embodiments, devices 13-15 may scan stamp 211 remotely by using camera 200.

Figure 3:
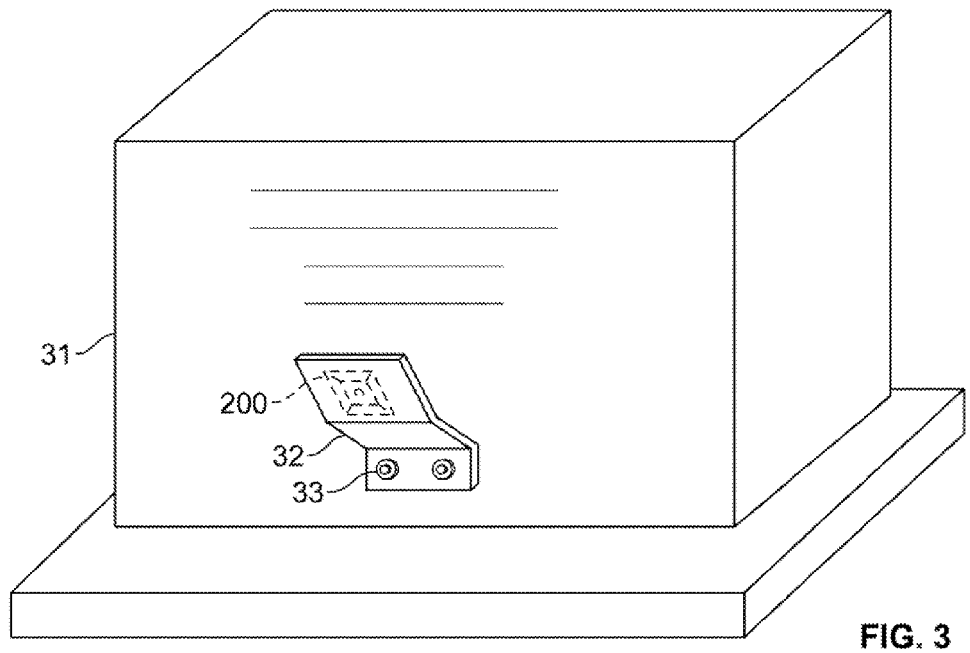
FIG. 3 shows an example of a memorial in accordance with some embodiments of the disclosed subject matter.

FIG. 3 depicts an example diagram of memorial 10 in accordance with some embodiments of the disclosure. As illustrated, S-shaped metal bracket 32 may be attached to the memorial by anchors 33. The metal bracket can be made out of stainless steel, bronze, aluminum or another weather-resistant material. Camera 200, or portions thereof (e.g., the camera component of camera 200, but not the hardware processor and/or other circuitry) may be mounted on the inside of the bracket facing the memorial.

Figure 4:
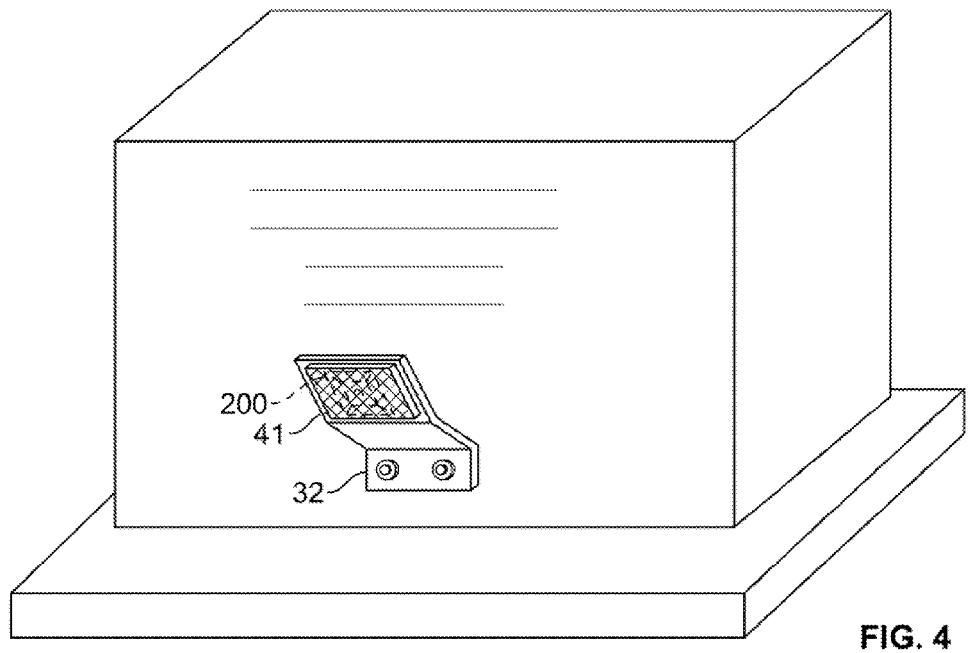
FIG. 4 shows an example of a miniature solar panel attached to a metal bracket in accordance with some embodiments of the disclosed subject matter.
Figure 5:
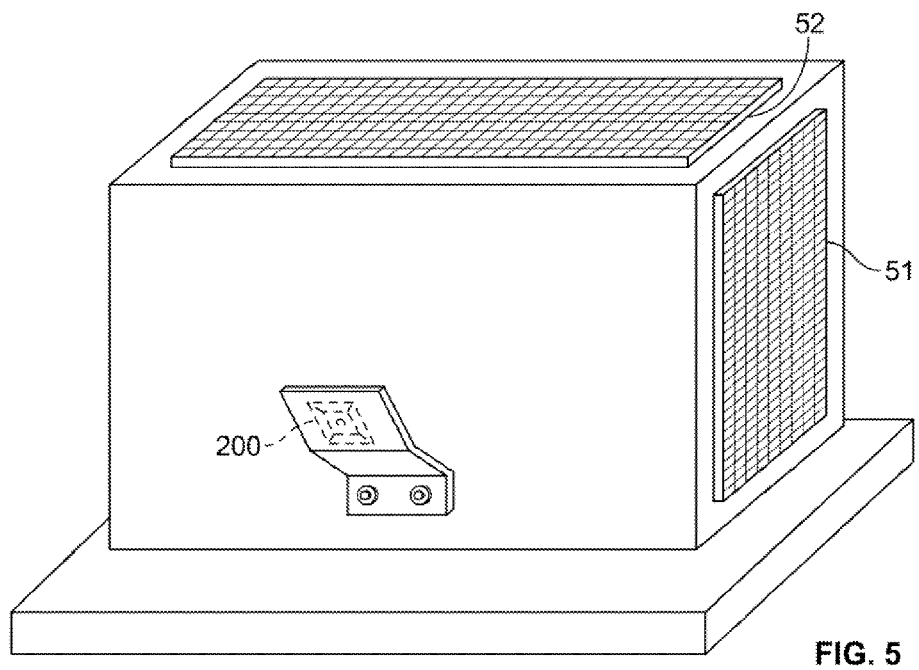
FIG. 5 shows an example of large solar panels mounted on a memorial in accordance with some embodiments of the disclosed subject matter.

FIG. 4 depicts an example of a miniature solar panel 41 designed as one unit with the rechargeable battery and attached to the metal bracket 32 on the opposite side of camera 200. FIG. 5 shows larger solar panels 51 and 52 mounted on the memorial. Solar panel 51 is mounted on the memorial's top flat surface and is intended for climates with no snow. Solar panel 52 is mounted on the side of the memorial which receives most sunlight. This is preferable setup for climates where snow may cover the top horizontal memorial surface. A combination of top mounted and side mounted solar panels may as well be feasible. Also combinations of two side mounted panels, side and back or front and back mounted panels may be practicable depending on the memorial orientation in reference to the sun.

Figure 6:
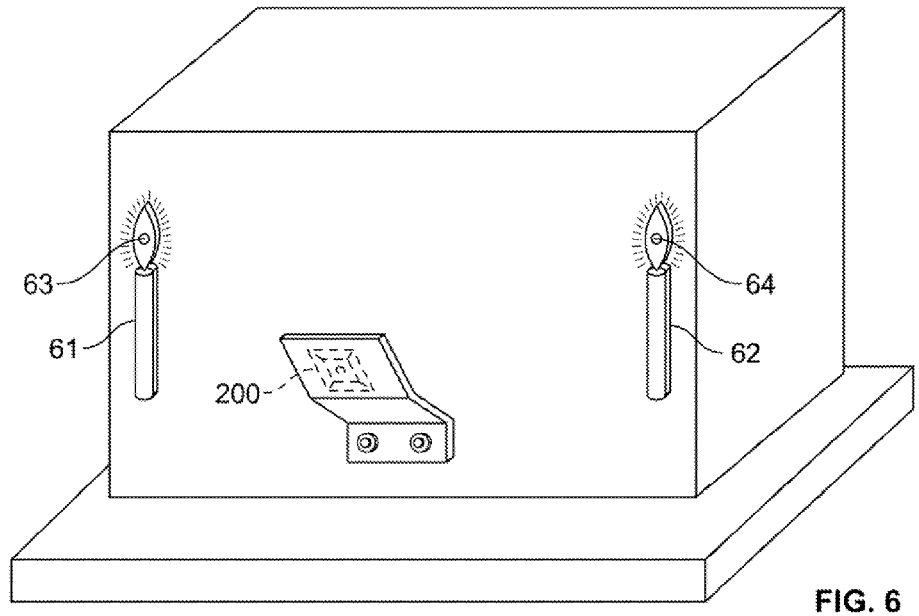
FIG. 6 shows an example of two candle-shaped decorative ornaments on a front surface of a memorial in accordance with some embodiments of the disclosed subject matter.
Figure 7:
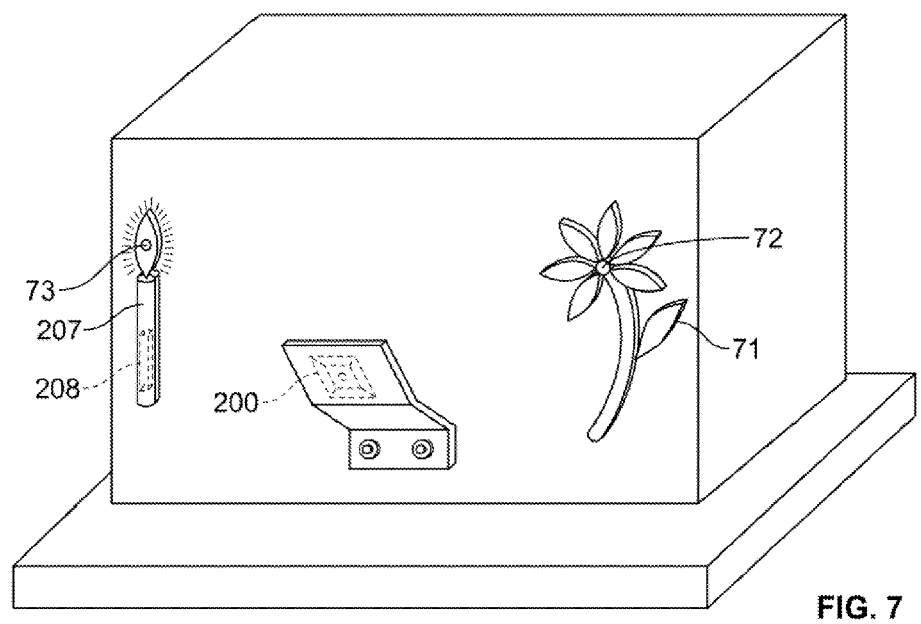
FIG. 7 shows an example of a candle-shaped decorative ornament and a flower-shaped decorative ornament on a front surface of a memorial in accordance with some embodiments of the disclosed subject matter.

FIG. 6 shows two candle-shaped decorative ornaments 61 and 62 placed on the front surface of the memorial. LED lights 63 and 64 are installed inside the ornament and can be lit by a command from the remote user transmitted via the camera 200 or by a timer or photo sensor built-in camera 200. As illustrated in FIG. 7, one of the candles from FIG. 6 can be replaced with flower ornament 71. As described above, LED lights 72 inside the flower can be controlled by the distant user via camera 200 or by a timer or photo sensor built-in the camera. As will be readily appreciated, the candle and the flower from FIG. 7 can be replaced with any type of decorative ornament desired by the customer. Together with the LED light 73, a miniature sound playing device 208 can be incorporated in the ornament. By a command from the remote end user via camera 200 this device can play a religious song, a poem, a deceased's favorite music, etc. which is stored in its memory and which can be heard at the other end of the line via a built-into camera 200 microphone.

FIG. 8 shows a second mobile data (e.g., Wi-Fi, 3G, 4G wireless data, etc.) enabled digital camera (or smartphone) 206 mounted on the memorial and facing away from it. The body of camera 206 may be concealed in a special memorial cavity for security reasons while leaving only lens 82 exposed on the memorial's surface. In some embodiments, camera 206 may record images and voice messages from visitors at the grave site where the memorial is installed. Additionally or alternatively, camera 206 may automatically record and send a warning alert in case of grave vandalism.

Figure 9:
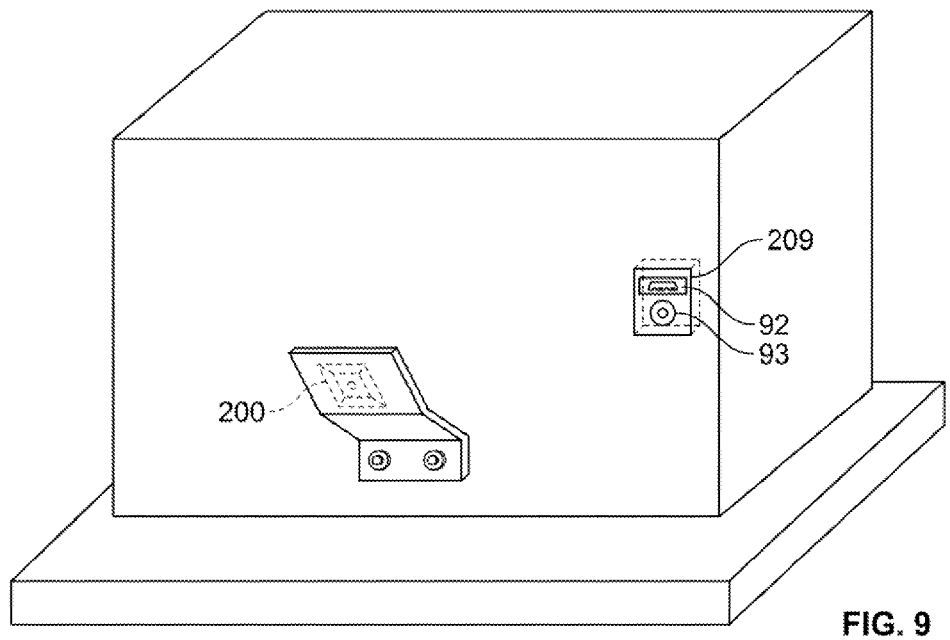
FIG. 9 shows an example of a device embedded in a memorial in accordance with some embodiments of the disclosed subject matter.

FIG. 9 depicts an example of device 209 embedded in the memorial in such a way that only the USB jack 92 and the communication sensor 93 are flush with the memorial surface. The USB jack may be used to provide access to recorded audio and video information for actual grave site visitors with hand-held plug-in devices. The communication sensor may be used to provide access to the same records for distantly located end user via the camera 200.

Figure 10:
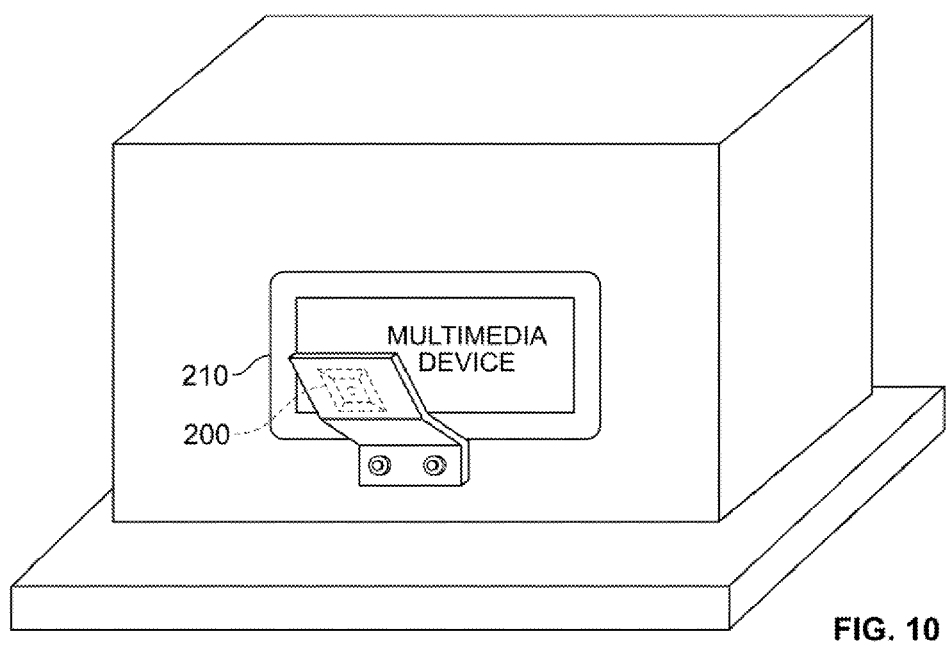
FIG. 10 shows an example of a memorial equipped with a media player in accordance with some embodiments of the disclosed subject matter.

FIG. 10 illustrates the incorporation of the present invention in a memorial which has been equipped with media player 210. As illustrated, camera 200 may be positioned on the memorial in such a way that it is able to capture the images and sounds played by media player 210. In some embodiments, media player 210 may be activated, deactivated, and otherwise controlled by one of devices 13-15 via camera 200.

Figure 11:
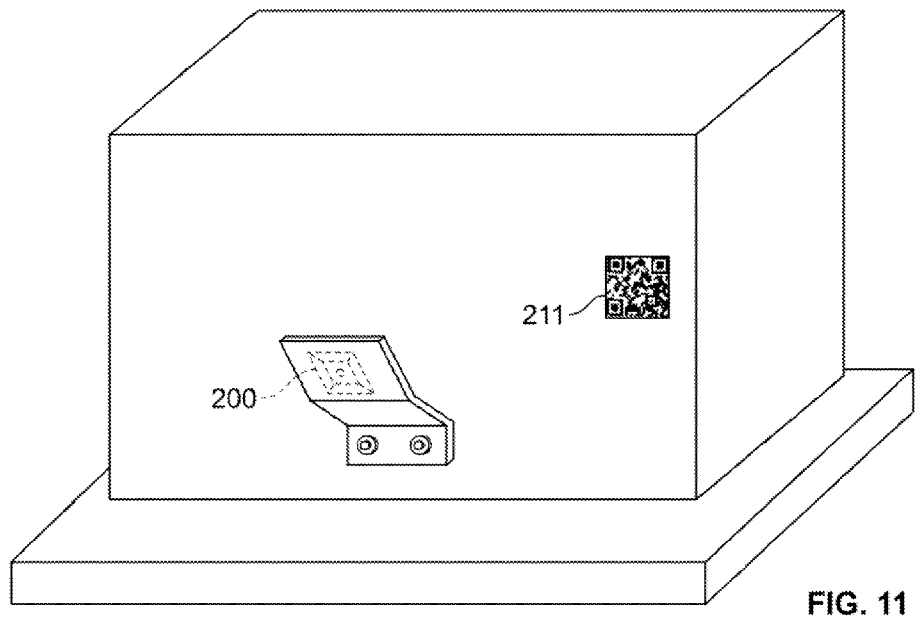
FIG. 11 shows an example of a memorial equipped with a Quick Response Code Stamp device in accordance with some embodiments of the disclosed subject matter.

FIG. 11 illustrates the incorporation of the present invention in a memorial which has been equipped with Quick Response (QR) Code device 211. As illustrated, camera 200 may be positioned on the memorial in such a way that it is able to read the QR device code and transmit it to the remote end user.

Figure 12:
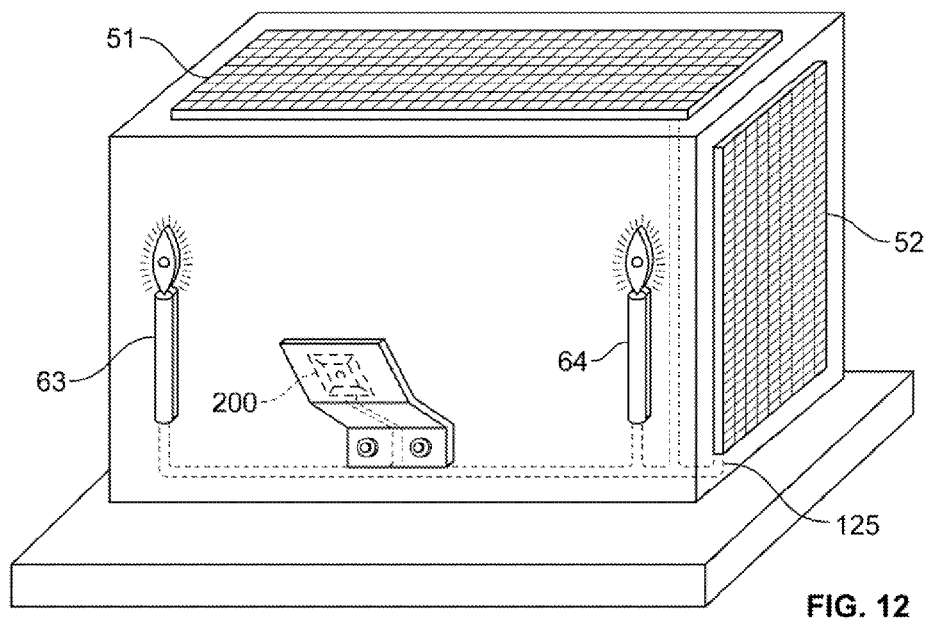
FIG. 12 shows an example of internal hard-wired connections between solar panels described in connection with FIG. 5, a camera described in connection with FIG. 2, and decorative ornaments described in connection with FIG. 6.
Figure 13A:
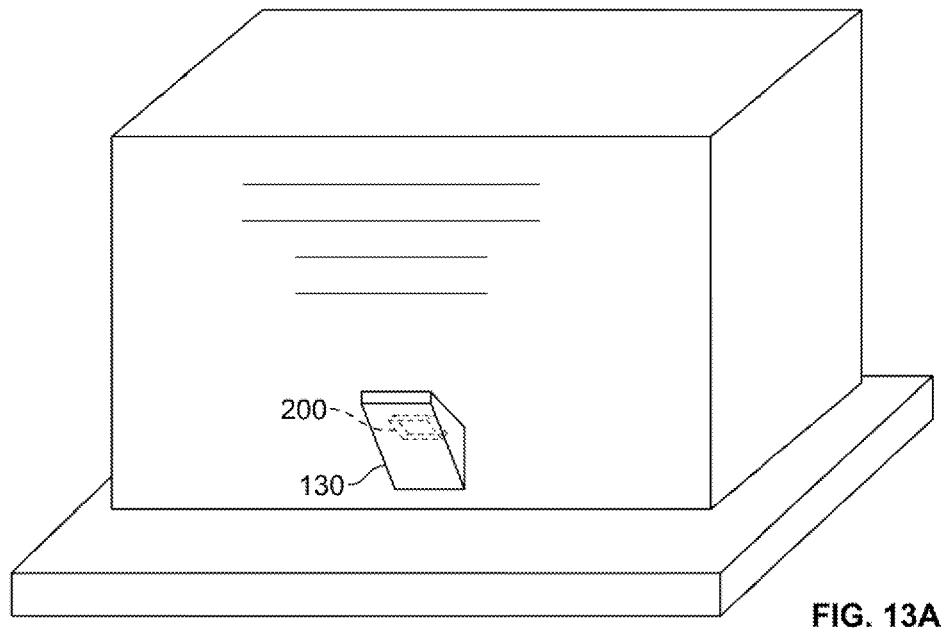
FIGS. 13A-13D show examples of multiple types of mounting brackets for a camera in accordance with some embodiments of the disclosed subject matter.
Figure 13B:
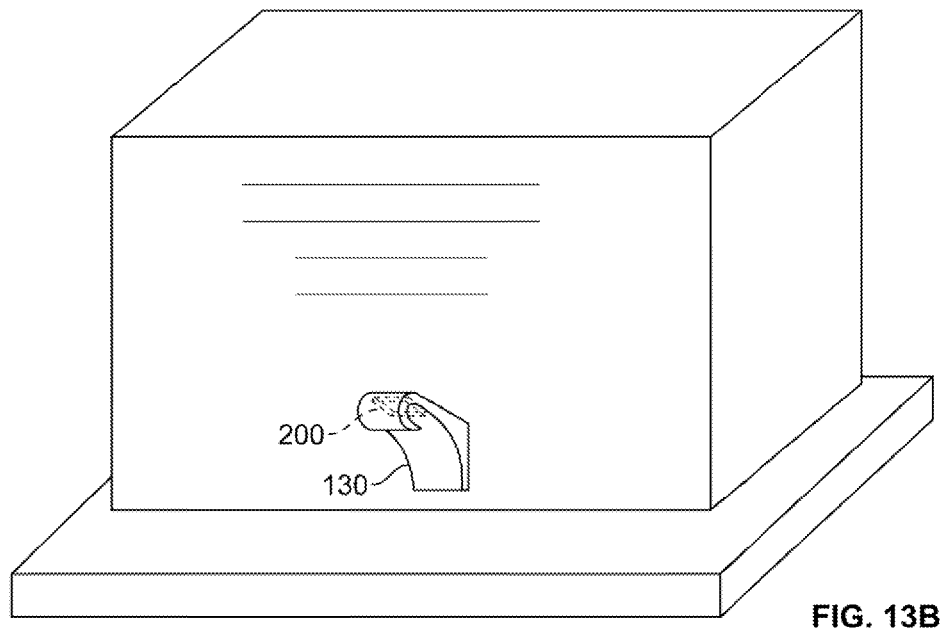
Figure 13C:
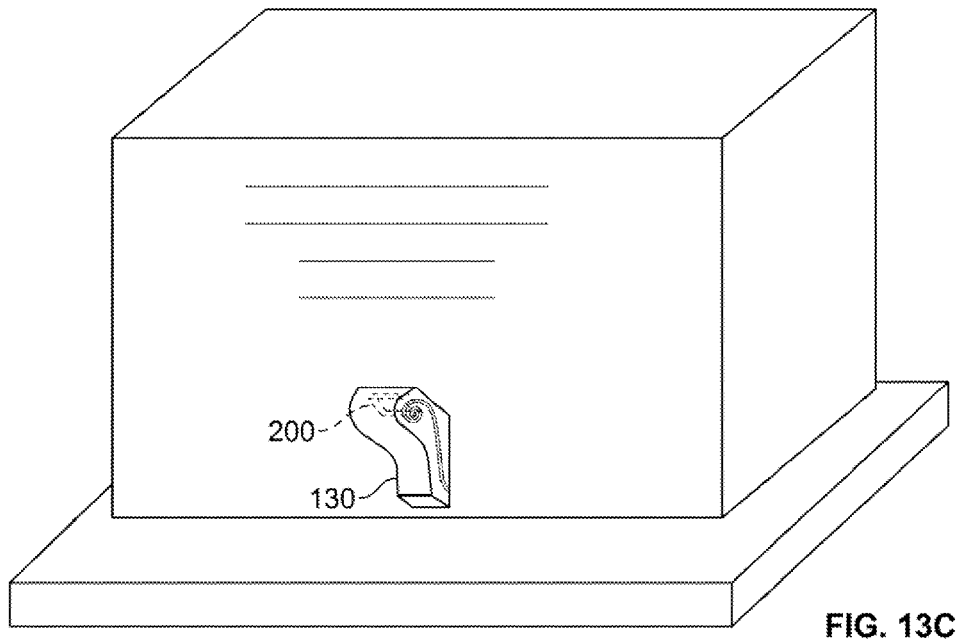
Figure 13D:
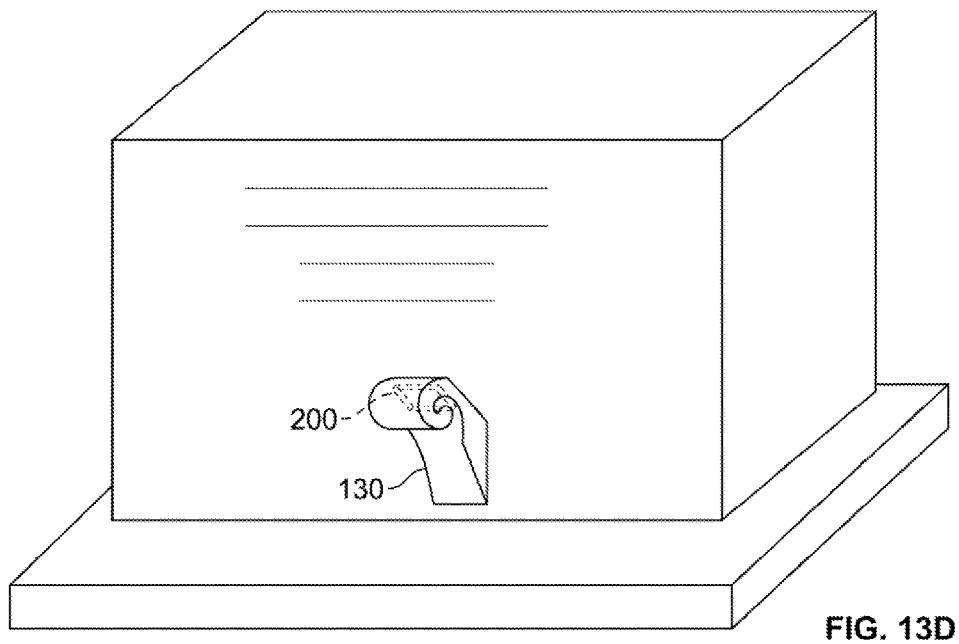

FIG. 12 depicts the internal hard-wired connections between the solar panels 51 and 52 from FIG. 5, camera 200, and decorative ornaments 63 and 64 from FIG. 6. The connecting conductors can be placed in surface mounted wire raceways or internal raceways 125 drilled into the memorial.

Figure 14A:
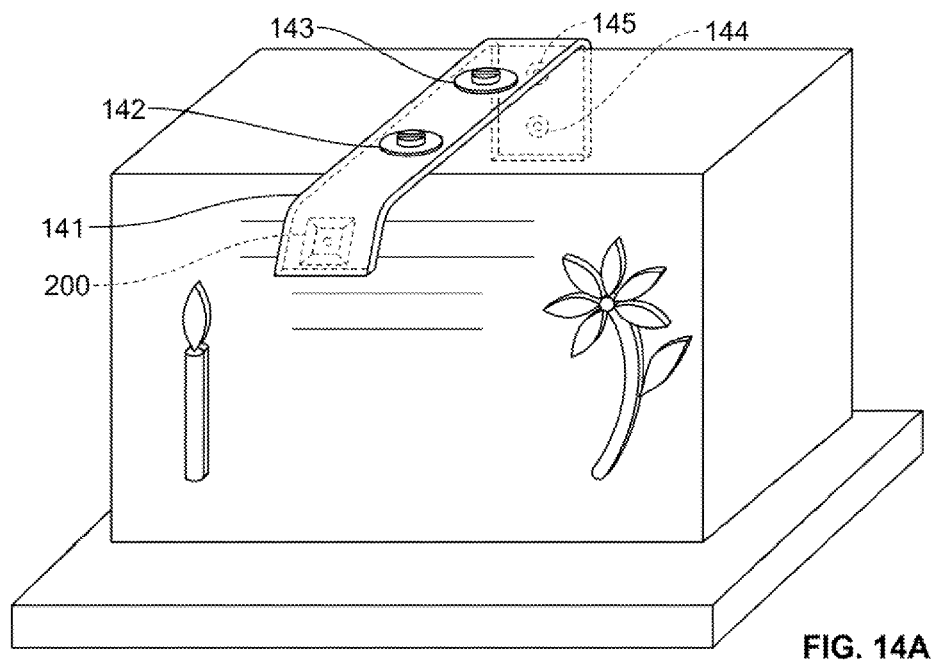
FIG. 14A shows a front view of an example of a metal mounting bracket in accordance with some embodiments of the disclosed subject matter.
Figure 14B:
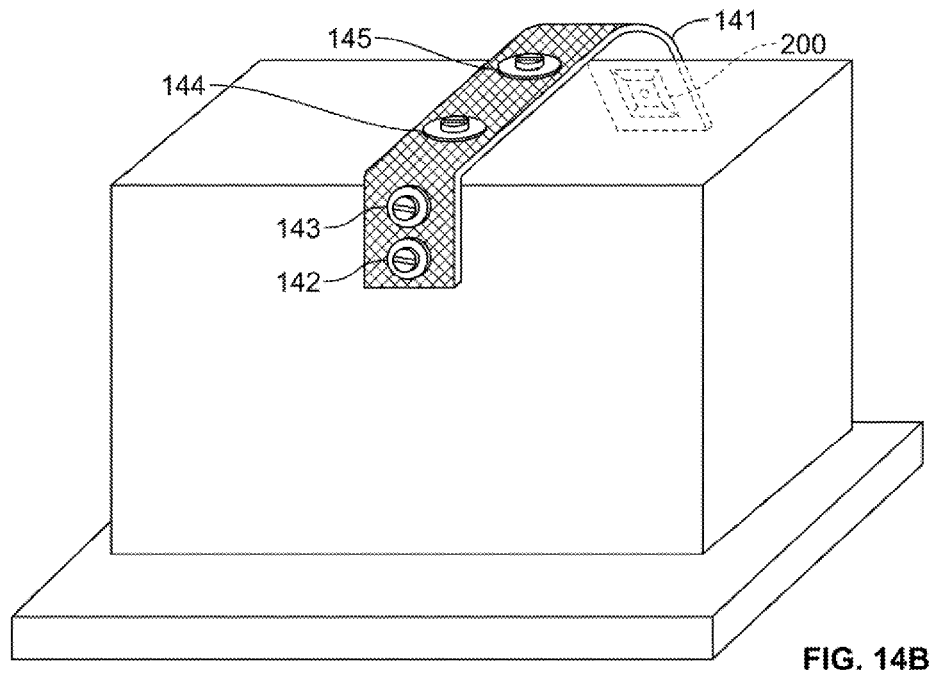
FIG. 14B shows a rear view of an example of a metal mounting bracket in accordance with some embodiments of the disclosed subject matter.
Figure 15:
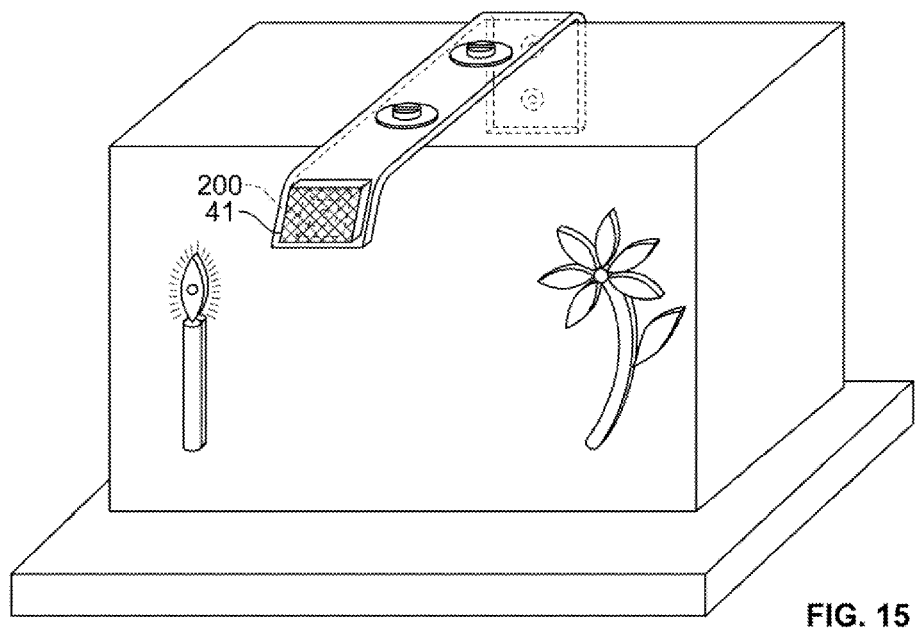
FIG. 15 shows an example of a metal bracket described in connection with FIGS. 14A and 14B integrated with a miniature solar panel as described in connection with FIG. 4 in accordance with some embodiments of the disclosed subject matter.
Figure 16:
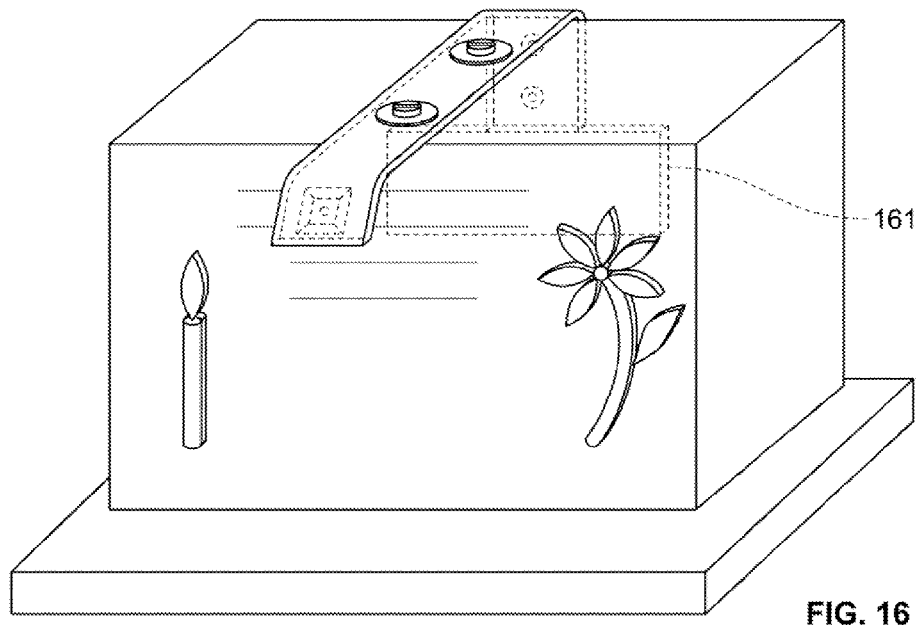
FIG. 16 shows an example of a metal bracket described in connection with FIGS. 14A and 14B with a solar panel mounted on the back of a memorial in accordance with some embodiments of the disclosed subject matter.
Figure 17:
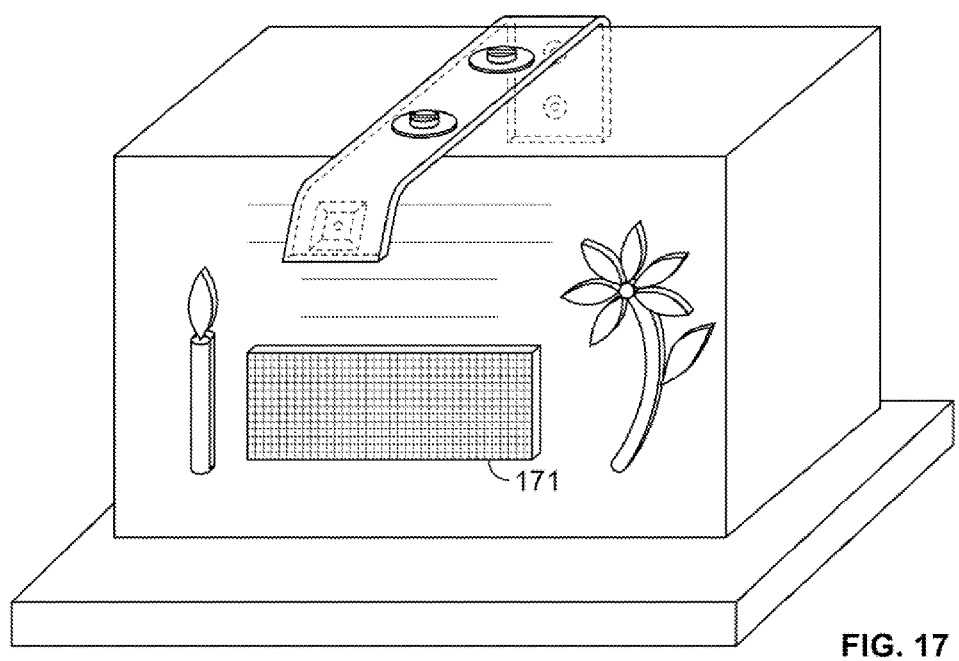
FIG. 17 shows an example of a metal bracket described in connection with FIGS. 14A and 14B with a solar panel mounted on the front of a memorial in accordance with some embodiments of the disclosed subject matter.
Figure 18:
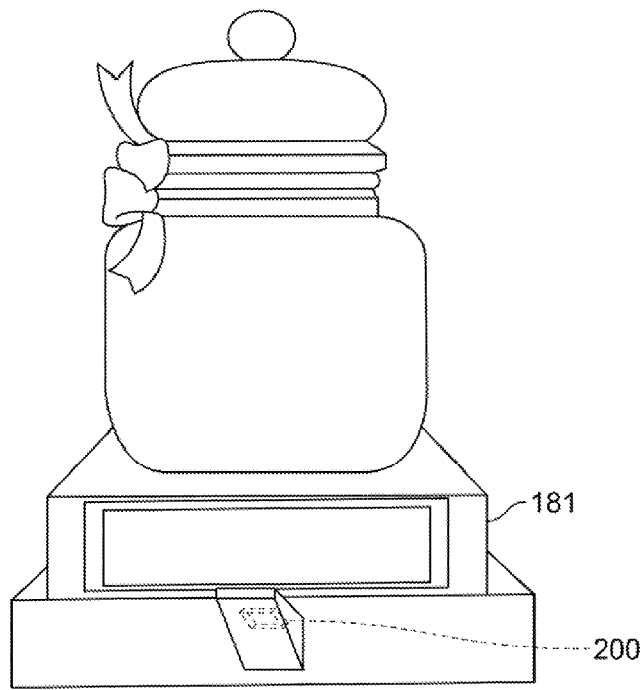
FIG. 18 shows an example of a cremation urn memorial in accordance with some embodiments of the disclosed subject matter.
Figure 19:
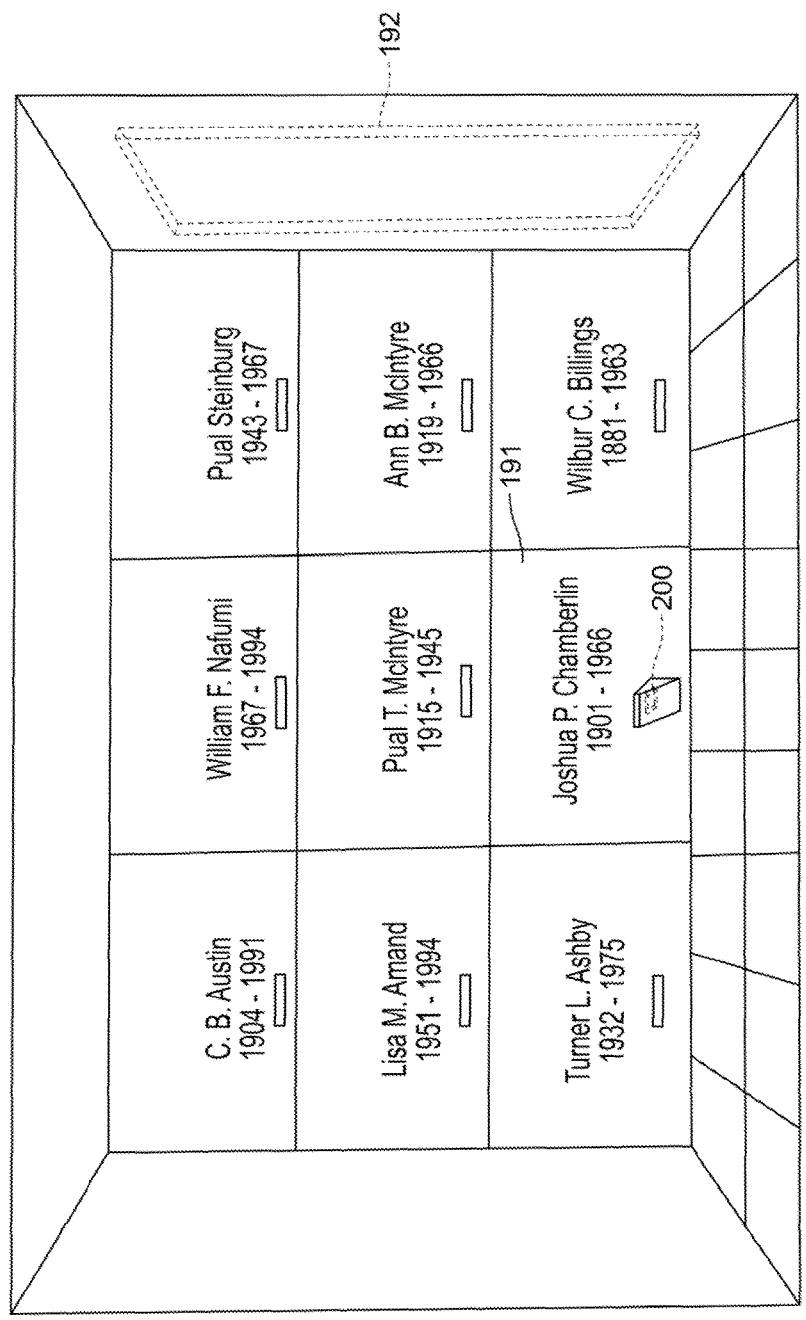
FIG. 19 shows an example of a mausoleum wall mounting in accordance with some embodiments of the disclosed subject matter.

FIGS. 13A-D illustrate examples of different types of mounting brackets 130 for camera 200. The brackets may be made out of stone or stone imitating composite simulating the memorial material. In some embodiments, the brackets may be attached to the memorial by the means of hidden anchors or specialized glue. FIGS. 14A and 14B illustrate a different type of metal mounting bracket 141. It can be used in cases where mounting bracket 130 on the memorial's surface is not feasible or in places where snow accumulations may block the lens of camera 200. FIG. 14A shows front view of the bracket attachment to the memorial and FIG. 14B shows rear view. Bolts 142, 143, 144 and 145 with metal or plastic expansion anchors may be used to hold bracket 141 onto the memorial's surface. FIG. 15 shows the metal bracket from FIGS. 14A and 14B with a miniature solar panel 41 (from FIG. 4) integrated as one unit with the rechargeable battery mounted on the opposite to the camera 200 side of the bracket. FIG. 16 shows the metal bracket from FIGS. 14A and 14B with solar panel 161 mounted on the back of the memorial. FIG. 17 shows the metal bracket from FIGS. 14A and 14B with Solar Panel 171 mounted on the front of the memorial. FIG. 18 illustrates the incorporation of the present invention in a custom cremation urn memorial 181. Since urns are generally located indoors, camera 200 is powered by solar panel rechargeable battery mounted on the roof or on the outside wall surface of the urn containing structure (not shown). FIG. 19 illustrates the incorporation of the present invention in a mausoleum or niche wall mountings 191. Since camera 200 will be located indoors, a Solar Panel 192 can be mounted on the roof or on the outside wall surface of the mausoleum.

In some embodiments, following a command from an end user's smartphone touchscreen, a digital video camera mounted on a grave marker turns on and automatically starts transmitting real-time video and audio through the established mobile data network connection. Upon the end of the communication session, camera switches back to stand-by mode. A motion sensor alarm circuit may be present within the camera and may be independent from the end user's commands and may always be armed except when being specifically turned "OFF." If activated, the motion sensor alarm circuit may cause the camera to send an alarming message in the form of direct call, e-mail or text message to predetermined list of end users whose addresses have been entered in advance.

In some embodiments, following a command from smartphone touchscreen relayed via the mobile data enabled camera, two candle-shaped LED lights placed on the tombstone can be lit as a special message. Instead of a candle, LED lights can illuminate a flower, a cross, a picture and so on. The local connection between the camera and the decoration element can be a hard wired connection, a Bluetooth-enabled connection, an Infrared connection, or a 315/433 MHz RF channel connection, etc.

In some embodiments, the LED lights can be set to turn automatically "ON" every night after dusk and turn "OFF" at dawn by a signal generated by the camera built-in photo sensor or turn on and off at certain times by the camera built-in time clock.

In some embodiments, a command from the smartphone can activate, via a mobile data enabled camera, a small digital audio storage device mounted inside the candle or flower which can play on its own built-in speaker a prerecorded poem, a religious song, or deceased's favorite music, etc.

In some embodiments, video and audio information about the deceased person such as a brief biography, lifetime images, music, voice messages, and the like can be stored in a multimedia storage-only USB-type device. Since it caters only to individuals physically present at the grave site, this embodiment may use regular RF or Bluetooth connectivity between the storage device and the hand held playing device.

In some embodiments, the information recorded in the above-mentioned storage device can be edited by authorized users. This can be achieved by the means of entering a PIN or password known only to those authorized to amend the records. Every time such a person remotely or physically "visits" the gravesite, he/she can leave a voice or visual message addressing the rest of the authorized users.

In some embodiments, if along with the storage-only device, the memorial has already been equipped with a media player, a mobile data enabled camera can be interconnected with that device to provide distant access to functions of the media player. The local connection between the camera and the multimedia player can be a hard wired connection, a Bluetooth-enabled connection, an Infrared connection, or a 315/433 MHz RF channel connection, etc. More importantly, the camera can "see" and transmit to the end user not only the contents of the digital storage, but the real-time image from the LCD display mounted on the actual memorial. The access to all or part of the recorded information can be protected by a PIN or password.

In some embodiments, a Quick Response (Q-R) code 1.5"×1.5" square stamp can be embedded in the grave marker. Scanned by a smartphone through the mobile network enabled digital camera, the Q-R code can be used to connect the distant user to a website with all the information a family may want in a memorial. Except for viewing, the website may provide for editing, video and audio messaging and virtual gathering of all the relatives and friends of the deceased with password authorization.

In some embodiments, a smartphone (cell phone running Apple iOS, Google's Android OS, Blackberry OS and the like) can be placed on the grave marker instead of the mobile network enabled digital camera. The smartphone's built-in (internal) camera can be used in the capacity of the above mentioned digital camera. The smartphone can have Face Time surveillance, Tango or similar application installed enabling it to automatically turn "on" its camera when receiving a video phone call.

The above embodiment has several advantages. For example, smartphones have built-in movement sensor which is different from the typical camera's motion sensor. This sensor gets activated when the phone itself has been moved, not when the camera detects moving in its field of vision. The feature can be used for anti-theft purposes. In case of an attempt for vandalizing the phone or the grave marker, instant cellular phone call, text-message or e-mail will be sent to all designated recipients, alerting them about the danger. Smartphones also have the capability to lock themselves in such situations and automatically take pictures of the criminals sending them (the pictures) to the phones of the designated recipients. Furthermore, as another example, if enabled, smartphones can generate loud alarm which serves as extra burglar protection. As yet another example, built-in GPS-based tracking feature can help locating stolen grave property.

In some embodiments, a second mobile network enabled digital camera can be mounted on the front surface of the memorial facing away from the grave. In one example, this additional camera may record images and voice messages from actual gravesite visitors. Their visit would be automatically recorded upon activation of camera's built-in motion sensor. In case they are "authorized" visitors (PIN or password holders), they could select using their smartphones which part of their visits and words at the grave to be recorded and displayed on the above-mentioned linked website. In another example, the additional camera may record images of grave vandals and automatically notify designated recipients or police. If, as described above, a smartphone with two cameras is used, the phone's built-in second internal camera can perform these functions. In some embodiments, the second smartphone can act as a wireless hot spot providing Wi-Fi connectivity for the first camera (e.g., smartphone) for enhanced video streaming quality.

In some embodiments, a second generation or newer iPad, a fourth generation Ipod Touch or a laptop computer with built-in 3G or 4G card or chipset can be used at the distant location as a control device instead of the smartphone for connection with the gravesite. In some embodiments of the invention a split type (two part) network digital video camera can be used at the grave marker for concerns of aesthetics and better vandal protection. In some embodiments, the camera body with the speaker can be fully concealed into the memorial while just the miniature camera lens and the microphone openings would be visible on the stone surface. In some embodiments, the present disclosure can be used with a pet memorial.

In accordance with some embodiments, any suitable hardware and/or software can be used to provide the mechanisms described herein. For example, a general purpose device such as a computer or a special purpose device such as a client, a server, etc. can be used to execute software for performing the mechanisms described herein. Any of these general or special purpose devices can include any suitable components such as a hardware processor (which can be a microprocessor, digital signal processor, a controller, etc.), memory, communication interface(s), a display interface and display, a camera sensor (or image sensor), a user input device, a database and/or storage, a communications bus, audio/video output circuitry, etc. Communications interfaces can enable the hardware and/or software to communicate with other communications networks (e.g., such as the Internet, wired networks, wireless networks, etc.) and/or any other suitable networks, devices, etc. This hardware and/or software can be implemented as part of other equipment or can be implemented as stand-alone equipment (which can be coupled to other equipment).

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A system for providing video of a physical burial memorial structure comprising:
   a physical burial memorial structure with a QR code displayed thereon;
   a camera mounted to the physical burial memorial structure and directed toward the physical burial memorial structure, wherein the camera is configured to capture images of the physical burial memorial structure and generate the video including the images, and wherein the camera turns on by a local timer only at predetermined time intervals during the day;
   a transceiver that is coupled to the camera, that receives the video, that transmits the video to the remote user device, and that receives audio from the remote user device;
   an audio output device that is coupled to the camera using a wireless communication connection and that receives the audio from the remote user device and that plays the audio at the physical burial memorial structure; and a battery and at least one solar panel for providing power to the camera, the transmitter, and the audio output device.

2. The system of claim 1, further comprising a light that is attached to the physical burial memorial structure.

3. The system of claim 1, further comprising a microphone for a capturing audio from the physical burial memorial structure.

4. The system of claim 1, wherein the physical burial memorial structure is at least one of a grave marker, a grave stone, an urn, and a mausoleum.

5. A method for providing video of a physical burial memorial structure comprising:
- turning on a camera directed toward the physical burial memorial structure with a QR code displayed thereon by a local timer at predetermined time intervals during the day;
- turning off the camera by a local timer at predetermined time intervals during the day;
- capturing images of the physical burial memorial structure using the camera and generating the video including the images;
- receiving the video, transmitting the video to the remote user device, and receiving audio from the remote user device;
- receiving the audio and playing the audio at the physical burial memorial structure using an audio output device that is coupled to the camera using a wireless communication connection; and
- providing power to the camera, a transmitter, and the audio output device using a battery and at least one solar panel.

6. The method of claim 5, illuminating a light attached to the physical burial memorial structure.

7. The method of claim 5, further comprising capturing audio from the physical burial memorial structure.

8. A non-transitory computer-readable medium containing computer executable instructions that, when executed by a processor, cause the processor to perform a method for presenting video of a physical burial memorial structure, the method comprising:
- turning on a camera directed toward the physical burial memorial structure with a QR code displayed thereon based on a local timer at predetermined time intervals during the day;
- turning off the camera based on a local timer at predetermined time intervals during the day;
- receiving video from a camera which captures images of the physical burial memorial structure and generates the video including the images;
- transmitting the video to the remote user device using a transmitter, and receiving audio from the remote user device; and
- receiving the audio and causing the audio to be played at the physical burial memorial structure using an audio output device that is coupled to the camera using a wireless communication connection,
- wherein the camera, the transmitter, and the audio output device are powered using a battery and at least one solar panel.

9. The non-transitory computer readable medium of claim 8, the method further comprising illuminating a light attached to the physical burial memorial structure.

10. The non-transitory computer readable medium of claim 8, the method further comprising capturing audio from the physical burial memorial structure.

* * * * *